US008605452B2

(12) United States Patent
Tang

(10) Patent No.: US 8,605,452 B2
(45) Date of Patent: *Dec. 10, 2013

(54) CHIP CARD HOLDING MECHANISM AND PORTABLE ELECTRONIC DEVICE

(75) Inventor: Zi-Ming Tang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 14 days.

This patent is subject to a terminal disclaimer.

(21) Appl. No.: 13/531,739

(22) Filed: Jun. 25, 2012

(65) Prior Publication Data

US 2013/0094162 A1    Apr. 18, 2013

(30) Foreign Application Priority Data

Oct. 17, 2011    (CN) .......................... 2011 1 0314552

(51) Int. Cl.
*H05K 5/00*    (2006.01)
(52) U.S. Cl.
USPC ........... 361/754; 361/752; 361/759; 361/769; 361/787; 361/798
(58) Field of Classification Search
USPC ......... 361/737, 748, 752, 754, 759, 769, 787, 361/798, 801, 807, 825, 829, 361/679.31–679.32, 679.38–679.39, 727
See application file for complete search history.

(56) References Cited

U.S. PATENT DOCUMENTS

| | | | | |
|---|---|---|---|---|
| 7,081,020 B1 * | 7/2006 | Lee | ............................... | 439/630 |
| 7,811,106 B2 * | 10/2010 | Lin et al. | ....................... | 439/159 |
| 8,270,175 B2 * | 9/2012 | Duan et al. | .................... | 361/737 |

* cited by examiner

*Primary Examiner* — Robert J Hoffberg
*Assistant Examiner* — Hung Dang
(74) *Attorney, Agent, or Firm* — Altis Law Group, Inc.

(57) ABSTRACT

A chip card holding mechanism includes a bracket, an unlock member and a tray. The bracket defines a receiving chamber. The unlock member is assembled adjacent to the opening of the bracket. The movable tray is assembled to and received within the receiving chamber of the bracket by the unlock member. The tray includes a supporting portion for receiving a chip card, a draw-off portion formed on a first end of the supporting portion, and a resisting block formed on the draw-off portion. The unlock member includes a main portion and an ejecting portion formed on the main portion, the ejecting portion slidably resists against the corresponding resisting block of the tray, for providing an ejecting force to eject the tray away from the bracket. An electronic device using the chip card holding mechanism is also provided.

18 Claims, 7 Drawing Sheets

CHIP CARD HOLDING MECHANISM AND PORTABLE ELECTRONIC DEVICE

BACKGROUND

1. Technical Field

The present disclosure generally relates to holding mechanisms, and particularly to a chip card holding mechanism and an electronic device using the chip card holding mechanism.

2. Description of Related Art

Chip card holding mechanisms are applied to electronic devices for holding chip cards that are assembled within the electronic devices. However, existing chip card holding mechanisms may be wholly assembled within the electronic device and positioned under a battery and/or a back cover of the electronic device. Therefore, when detaching or installing the chip card, the back cover and/or the battery of the electronic device must first be removed. In addition, the chip card holding mechanism has a complicated structure and is difficult to use.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure.

DETAILED DESCRIPTION

Figure 1:
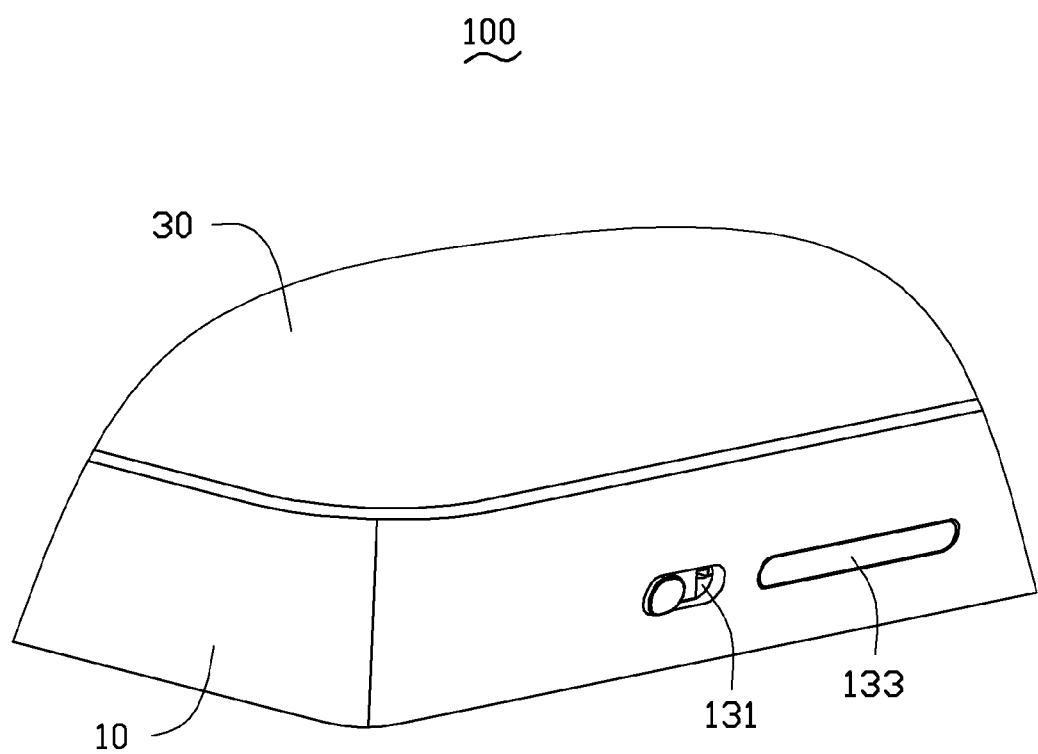
FIG. 1 shows a partial, isometric view of an embodiment of an electronic device.

FIG. 1, is an embodiment of an electronic device 100. The electronic device 100 can be a tablet computer, a mobile phone, or a camera, for example. In the illustrated embodiment, the electronic device 100 is a tablet computer. Also referring to FIG. 2, the electronic device 100 includes a housing 10, a display 30 mounted to the housing 10, and a chip card holding mechanism 50 assembled within the housing 10 for holding a chip card, such as a SD card, a multimedia card, or a SIM card, for example.

The housing 10 is substantially rectangular, and includes a bottom wall 11 and a rectangular peripheral wall 13 perpendicularly extending from a periphery of the bottom wall 11. The peripheral wall 13 defines an unlock slot 131 through one side wall (not labeled) of the peripheral wall 13, and a card insert slot 133 adjacent to the unlock slot 131. A mounting base 15 is formed on the bottom wall 11 and positioned adjacent to the unlock slot 131 and the card insert slot 133, for mounting the chip card holding mechanism 50.

The chip card holding mechanism 50 is mounted on the mounting base 15 and received within the housing 10, for receiving and holding a chip card inserted through the card insert slot 133. The chip card holding mechanism 50 includes a bracket 60, a tray 70, an unlock member 80, and a fixing board 90. The bracket 60 is fixedly mounted on mounting base 15. The tray 70 is detachably assembled to the bracket 60 by the unlock member 80 and is capable of passing through the card insert slot 133 of the housing 10. The fixing board 90 is fixedly mounted on the mounting base 15, adjacent to the card insert slot 133, and resists against the unlock member 80.

Figure 3:
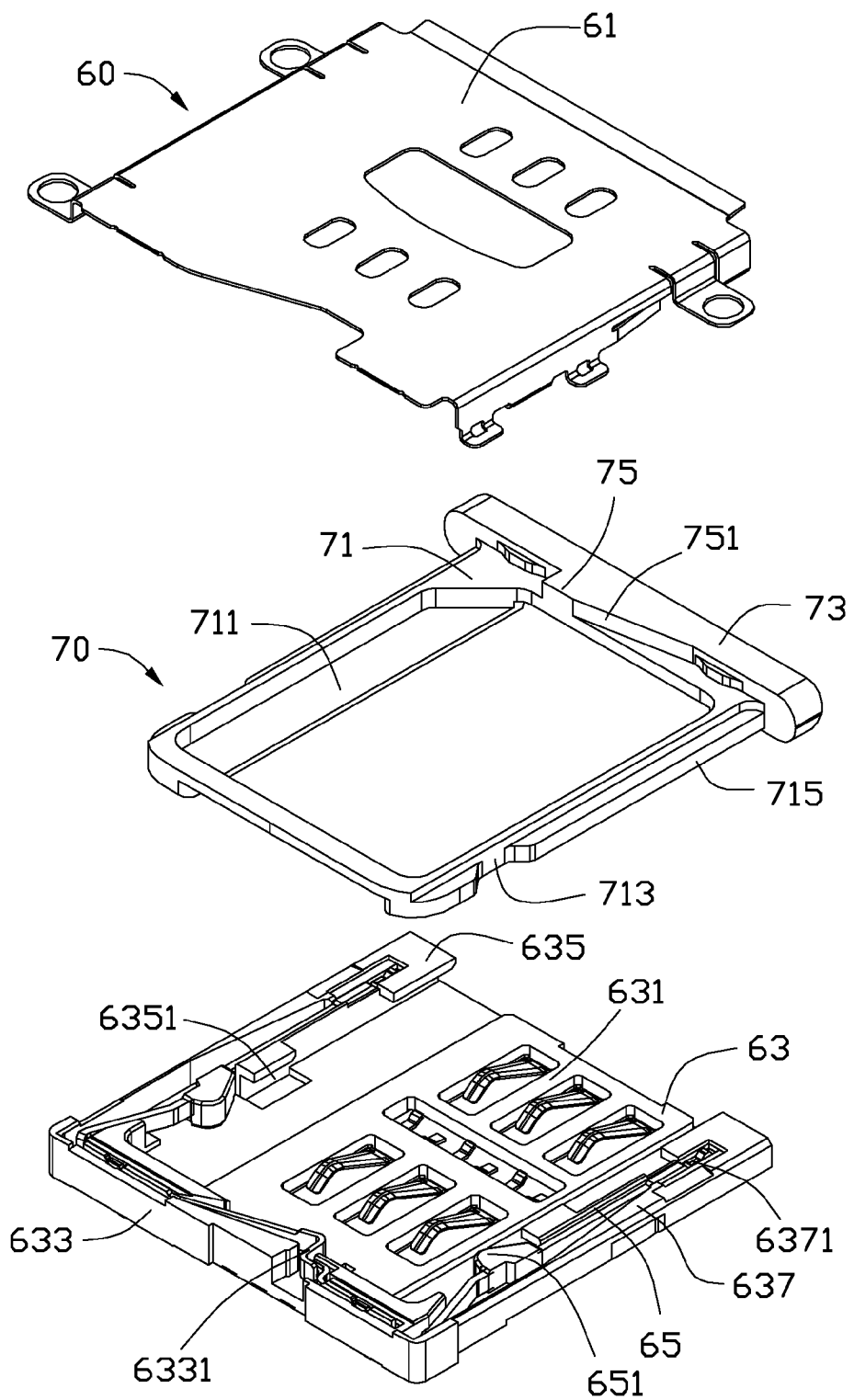
FIG. 3 shows an exploded isometric view of a bracket and a tray of the chip card holding mechanism of FIG. 2.
Figure 4:
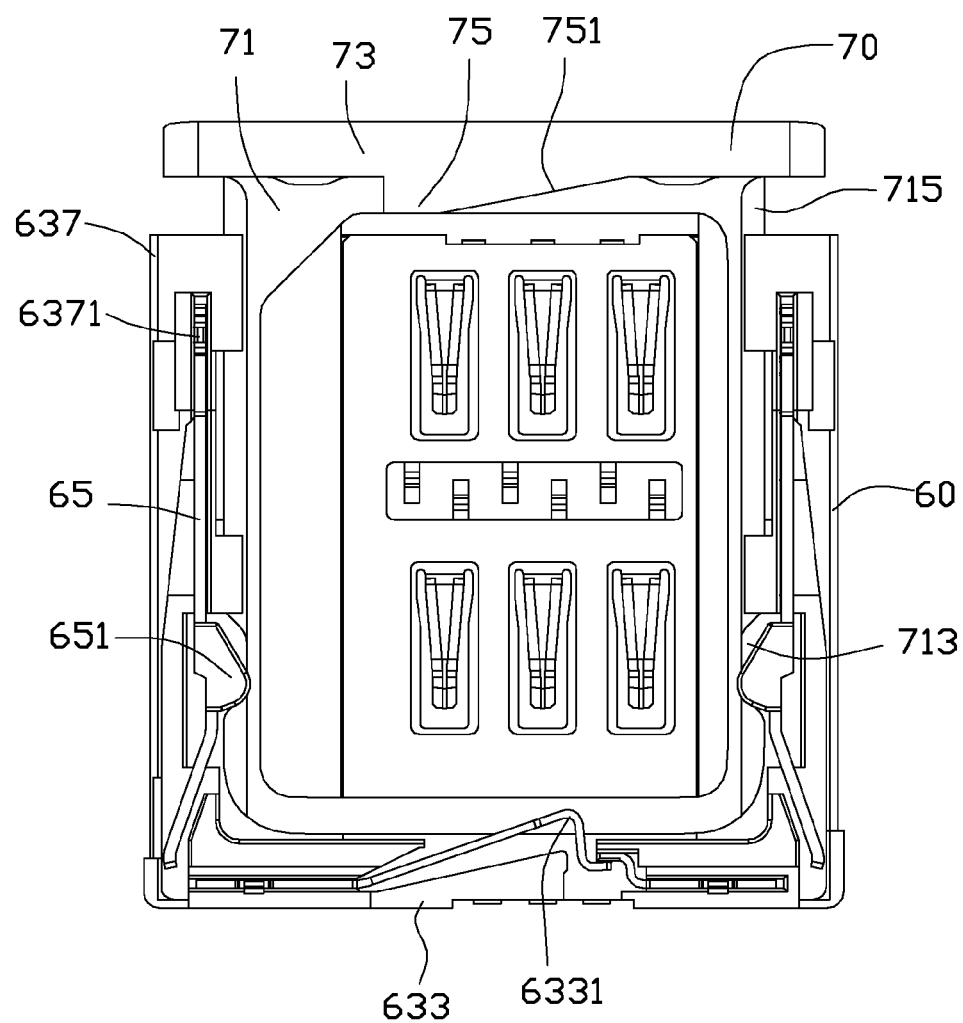
FIG. 4 shows an assembled isometric view of the bracket and the tray of FIG. 3.

Also referring to FIGS. 3 and 4, the bracket 60 includes an upper cover 61, a bottom cover 63 and two elastic members 65. The upper cover 61 is mounted over the bottom cover 63 and cooperatively defines a receiving chamber 613. The receiving chamber 613 has a substantially rectangular opening (not labeled) aligning with the corresponding card insert slot 133. In use, the chip card is placed on the tray 70 and inserted into the card insert slot 133 and received within the receiving chamber 613 together with the tray 70. The two elastic members 65 are oppositely mounted to two sides of the bottom cover 63 for elastically sandwiching two sides of the tray 70, within the receiving chamber 613.

The bottom cover 63 includes a main body 631, a resisting portion 633, two guiding portions 635, and two block portions 637. The main body 631 is a substantially rectangular board for supporting the tray 70. The resisting portion 633 is formed on one end of the main body 631 and positioned opposite to and away from the card insert slot 133. A bent elastic strip 6331 is mounted to the resisting portion 633 and received within the receiving chamber 613, for elastically resisting a distal end of the tray 70. The two guiding portions 635 are positioned opposite to each other, adjacent to two sides of the main body 631. Each guiding portion 635 defines a guiding slot 6351 toward a middle portion of the main body 631. The main body 631, the resisting portion 633, the two guiding portions 635 and the upper cover 61 cooperative define the receiving chamber 613. The two block portions 637 are oppositely formed on two sides of the main body 631 and positioned adjacent to the two guiding portions 635, respectively. Each block portion 637 defines a block slot 6371 for assembling one elastic member 65.

The two elastic members 65 are assembled into the two block slots 6371 of the two block portions 637, and partially received within the receiving chamber 613, for elastically resisting two sides of the tray 70. In the illustrated embodiment, the elastic member 65 is a bent elastic sheet, and includes an elastic blocking portion 651 formed on a substantially middle portion of the elastic member 65, toward the receiving chamber 613, for latching the tray 70 within the receiving chamber 613.

The tray 70 is slidably assembled to the bracket 60 and received within the receiving chamber 613. In the illustrated embodiment, the tray 70 includes a supporting portion 71, a draw-off portion 73 formed on one end of the supporting portion 71, and a resisting block 75. The supporting portion 71 defines a substantially rectangular recession 711 in a top surface of the supporting portion 71, for receiving the chip card, and further defines two block slots 713 oppositely recessed from two opposite sides of the supporting portion 71, corresponding to the two elastic blocking portions 651. Two guiding bars 715 are oppositely formed on two sides of the supporting portion 71 for slidably engaging into the corresponding two guiding slots 6351 of the bracket 60. The draw-off portion 73 is bar-shaped and has a dimension substantially the same as that of the card insert slot 133. As the supporting portion 71 of the tray 70 is totally received within the receiving chamber 613 of the bracket 60, the draw-off portion 73 is also received within the card insert slot 133. The resisting block 75 is a block substantially in the shape of a wedge formed on a middle portion of the draw-off portion 73 and facing toward the opposite other end of the supporting portion 71. The resisting block 75 has an inclined resisting surface 751 facing toward one side of the supporting portion 71.

Figure 2:
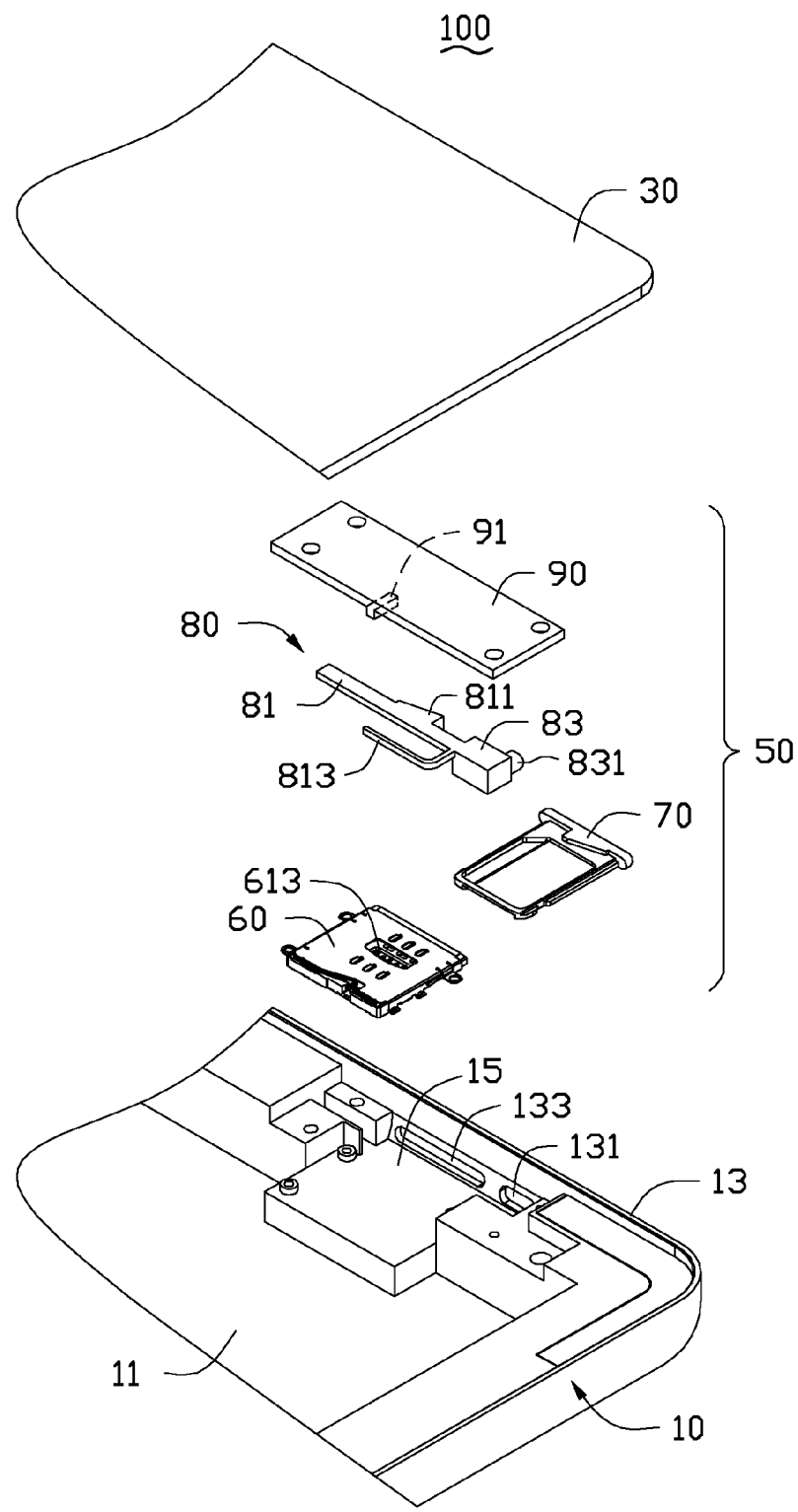
FIG. 2 shows an exploded, isometric view of the electronic device of FIG. 1, wherein the electronic device includes a housing, a display and a chip card holding mechanism.
Figure 5:
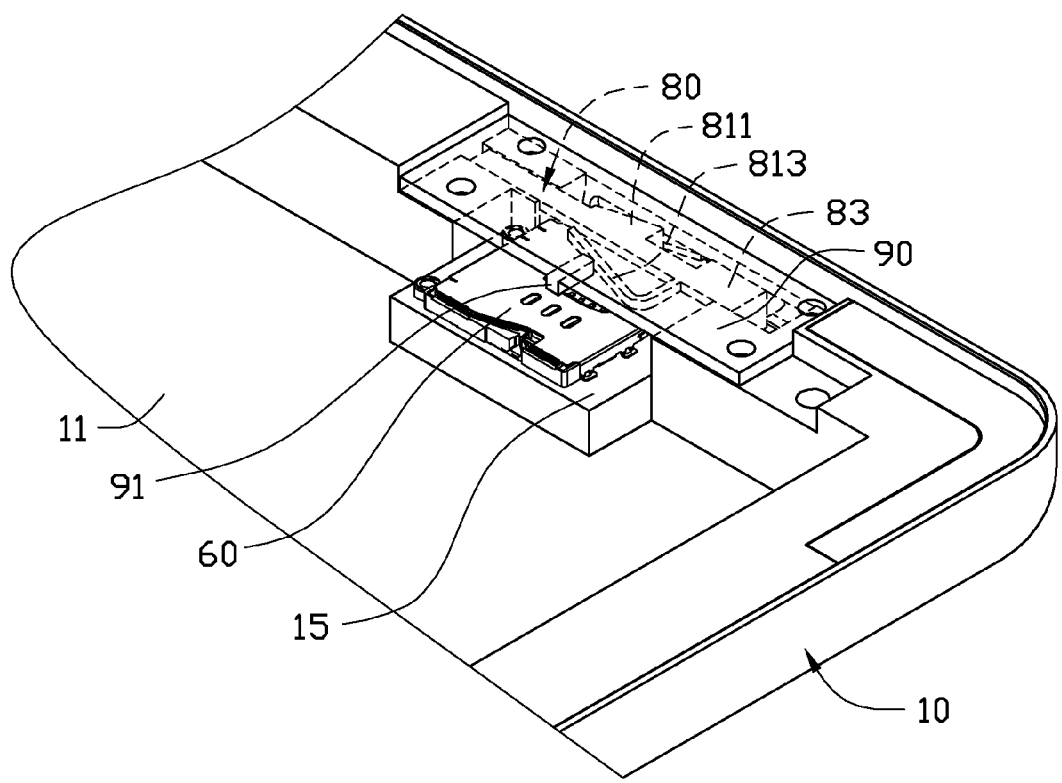
FIG. 5 shows a partial assembled isometric view of the electronic device of FIG. 2.

Also referring to FIGS. 2 and 5, the unlock member 80 is movably mounted on the mounting base 15 and positioned between the bracket 60 and the sidewall of the peripheral wall 13, and resists against the tray 70 for ejecting the tray 70 away from the bracket 60. The unlock member 80 includes a main portion 81 and a mounting portion 83 formed on one end of the main portion 81. The main portion 81 is substantially rectangular bar-shaped, and includes a substantially wedge-shaped ejecting portion 811 formed on a substantially middle portion of a first side of the main portion 81, corresponding to the resisting block 75 of the tray 70. A substantially L-shaped elastic arm 813 extends from a second side of the main portion 81, adjacent to the mounting portion 83, and is bent toward the other end of the main portion 81. An unlock portion 831 is formed on the mounting portion 83, away from the elastic arm 813 side, corresponding to the unlock slot 131 of the housing 10.

The fixing board 90 is fixedly assembled within the housing 10, and positioned above the bracket 60, and resists against the elastic arm 813 of the unlock member 80. The fixing board 90 forms a stopping block 91 corresponding to and resisting against the elastic arm 813.

Figure 6:
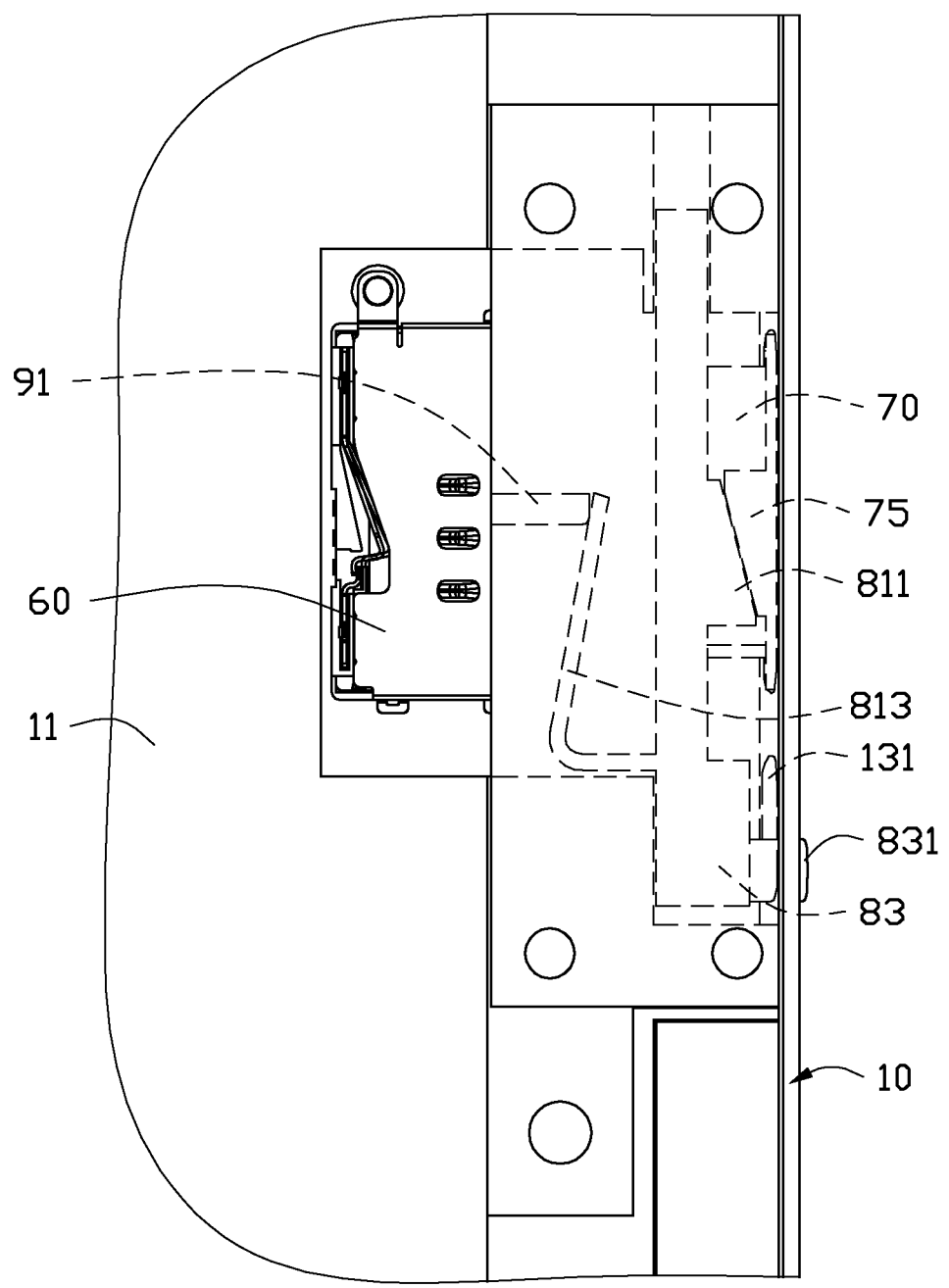
FIG. 6 is similar to FIG. 5, but viewed from another aspect.

Also referring to FIGS. 4 and 6, when assembling the chip card holding mechanism 50, the bracket 60 is firstly mounted on the mounting base 15 of the housing 10 with the opening 611 of the bracket 60 facing towards and aligning with the card insert slot 133 of the housing 10. The tray 70 is slidably assembled into the receiving chamber 613 of the bracket 60 by passing through the card insert slot 133 and the opening of the bracket 60. The two guiding bars 715 of the tray 70 slidably engage into the two guiding slots 6351 of the bracket 60. The two elastic blocking portions 651 of the two elastic member 65 latch into the two block slots 713 of the tray 70. The unlock member 80 is movably mounted on the mounting base 15 and positioned between the bracket 60 and the side wall of the peripheral wall 13. The ejecting portion 811 of the unlock member 80 resists against the corresponding inclined resisting surface 751 of the resisting block 75 of the tray 70, the unlock portion 831 passes through the unlock slot 131 and is partially exposed to the outside of the housing 10. The fixing board 90 is fixedly assembled above the bracket 60, and resists against the elastic arm 813 of the unlock member 80. The unlock member 80 is capable of being moved to thereby ejecting the tray 70 away from the bracket 60.

Figure 7:
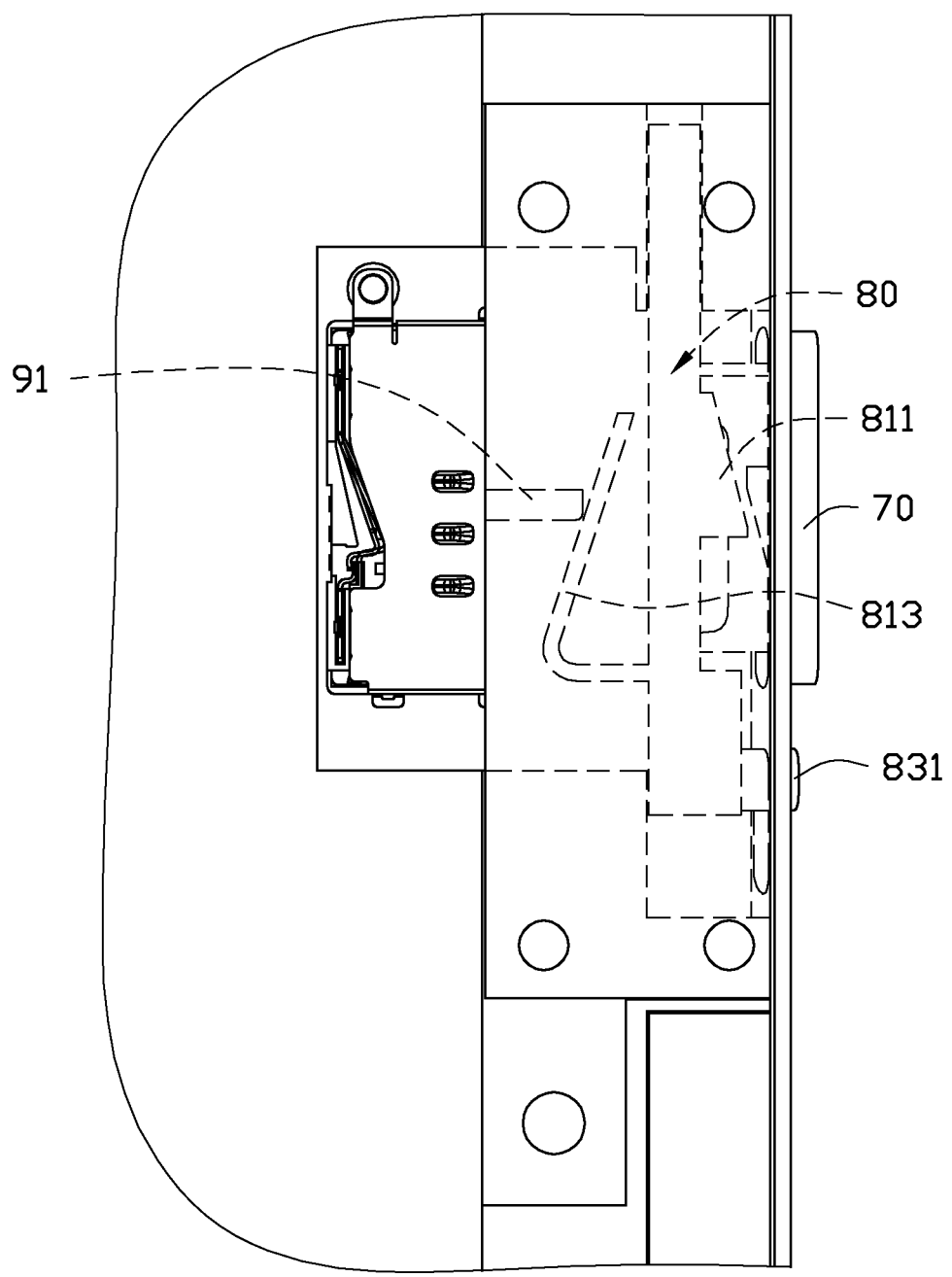
FIG. 7 is similar to FIG. 6, but viewed from another state of use.

Also referring to FIG. 7, in use, the unlock portion 831 is pushed to slide along the unlock slot 131 of the housing 10, the ejecting portion 811 of the unlock member 80 is driven to slidably resist against the corresponding inclined resisting surface 751 of the tray 70, thereby providing an ejecting force to unlock the tray 70. Meanwhile, the elastic arm 813 is bent, thereby further exerting an elastic force toward the card insert slot 133 for ejecting the tray 70 away from the bracket 60. The two elastic blocking portions 651 of the two elastic members 65 disengage from the two block slots 713 of the tray 70, respectively, and the draw-off portion 73 of the tray 70 is thus exposed from the card insert slot 133 of the housing 10, thereby allowing the user to insert or take out the chip card. Finally, the tray 70 is pushed into and received within the receiving chamber 613 of the bracket 60 to complete the chip card removal or installation operation by using the chip card holding mechanism 50.

While various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A chip card holding mechanism for an electronic device, comprising:
   a bracket defining a receiving chamber having an opening;
   an unlock member assembled adjacent to the opening of the bracket; and
   a tray detachably assembled to and received within the receiving chamber of the bracket by the unlock member, wherein, the tray comprises a supporting portion for receiving a chip card, a draw-off portion formed on a first end of the supporting portion, and a resisting block formed on the draw-off portion and facing toward an opposite second end of the supporting portion; the unlock member comprises a main portion and an ejecting portion formed on the main portion, the ejecting portion slidably resists against the corresponding resisting block of the tray, for providing an ejecting force to eject the tray away from the bracket.

2. The chip card holding mechanism of claim 1, wherein the resisting block has an inclined resisting surface facing toward one side of the supporting portion; the ejecting portion is substantially wedge-shaped, and formed on a first side of the main portion to slidably resisting against the inclined resisting surface of the resisting block.

3. The chip card holding mechanism of claim 2, wherein the unlock member further comprises a mounting portion formed on one end of the main portion, and an unlock portion formed on the mounting portion for driving the unlock member to slide.

4. The chip card holding mechanism of claim 2, wherein the bracket comprises a bottom cover, an upper cover mounted over the bottom cover, and two elastic members, the upper cover and the bottom cover cooperatively define the receiving chamber; the two elastic members are oppositely assembled into and positioned at two sides of the bottom cover; the supporting portion defines two block slots at two opposite sides thereof to engage with the two elastic members.

5. The chip card holding mechanism of claim 4, wherein the bottom cover comprises a main body, a resisting portion formed on one end of the main body, two guiding portions, and two block portions, the two guiding portions are oppositely formed adjacent to two sides of the main body, each guiding portion defines a guiding slot; the main body, the resisting portion, the two guiding portions and the upper cover cooperatively define the receiving chamber; the tray further comprises two guiding bars oppositely formed on two sides of the supporting portion and slidably engaging into the corresponding two guiding slots of the bottom cover.

6. The chip card holding mechanism of claim 5, wherein the bracket further comprises a bent elastic strip mounted to the resisting portion and received within the receiving chamber, for elastically resisting against a distal end of the tray.

7. The chip card holding mechanism of claim 5, wherein, the bottom cover further comprises two block portions oppositely formed on two sides of the main body and positioned adjacent to the two guiding portions respectively, each block portion defines a block slot for assembling one elastic member.

8. The chip card holding mechanism of claim 2, wherein the supporting portion defines a substantially rectangular recession in a top surface of the supporting portion, for receiving the chip card.

9. The chip card holding mechanism of claim 3, wherein, the unlock member further comprise an elastic arm extending from a second side of the main portion, the chip card holding mechanism further comprises a fixing board positioned above the bracket, and resisting against the elastic arm of the unlock member.

10. An electronic device, comprising:
a housing comprising a bottom wall and a rectangular peripheral wall, the peripheral wall defining an unlock slot and a card insert slot adjacent to the unlock slot; and
a chip card holding mechanism assembled within the housing and positioned adjacent to the card insert slot, for holding a chip card, the chip card holding mechanism, comprising:
a bracket mounted on the bottom wall of the housing and defining a receiving chamber having an opening aligning with the card insert slot of the housing;
an unlock member assembled adjacent to the opening of the bracket and the peripheral wall of the housing; and
a tray detachably assembled to and received within the receiving chamber of the bracket by the unlock member;
wherein, the tray comprises a supporting portion for receiving a chip card, a draw-off portion formed on a first end of the supporting portion, and a resisting block formed on the draw-off portion and facing toward an opposite second end of the supporting portion; the unlock member comprises a main portion, an ejecting portion formed on a first side of the main portion, and an unlock portion formed on one end of the main portion corresponding to the unlock slot; the ejecting portion faces toward the card insert slot and slidably resists against the corresponding resisting block of the tray, thereby providing an ejecting force to eject the tray away from the bracket toward the card insert slot; the unlock portion passes through the unlock slot and partially exposed to the outside of the housing for driving the unlock member to slide.

11. The electronic device of claim 10, wherein the resisting block has an inclined resisting surface facing toward one side of the supporting portion; the ejecting portion is substantially wedge-shaped, and formed on a first side of the main portion to slidably resisting against the inclined resisting surface of the resisting block.

12. The electronic device of claim 11, wherein the housing further comprises a mounting base formed on the bottom wall and positioned adjacent to the unlock slot and the card insert slot, the bracket is fixedly mounted on the mounting base, the ejecting portion is slidably assembled between the card insert slot and the bracket, and resists against the tray for ejecting the tray away from the bracket.

13. The electronic device of claim 12, wherein, the unlock member further comprises a mounting portion formed on one end of the main portion, and an unlock portion formed on the mounting portion for driving the unlock member to slide.

14. The electronic device of claim 12, wherein the bracket comprises a bottom cover, an upper cover mounted over the bottom cover, and two elastic members, the upper cover and the bottom cover cooperatively define the receiving chamber; the two elastic members are oppositely assembled into and positioned at two sides of the bottom cover; the supporting portion defines two block slots at two opposite sides thereof to engage with the two elastic members.

15. The electronic device of claim 14, wherein the bottom cover comprises a main body, a resisting portion formed on one end of the main body, two guiding portions, and two block portions, the two guiding portions are oppositely formed adjacent to two sides of the main body, each guiding portion defines a guiding slot; the main body, the resisting portion, the two guiding portions and the upper cover cooperatively define the receiving chamber; the tray further comprises two guiding bars oppositely formed on two sides of the supporting portion and slidably engaging into the corresponding two guiding slots of the bottom cover.

16. The electronic device of claim 15, wherein the bracket further comprises a bent elastic strip mounted to the resisting portion and received within the receiving chamber, for elastically resisting against a distal end of the tray.

17. The electronic device of claim 15, wherein, the bottom cover further comprises two block portions oppositely formed on two sides of the main body and positioned adjacent to the two guiding portions respectively, each block portion defines a block slot for assembling one elastic member.

18. The electronic device of claim 13, wherein, the unlock member further comprise an elastic arm extends from a second side of the main portion, the chip card holding mechanism further comprises a fixing board positioned above the bracket, and resisting against the elastic arm of the unlock member.

* * * * *